A. J. HAVRILLA.
DIRECTION INDICATOR.
APPLICATION FILED MAY 26, 1920.
1,366,261.
Patented Jan. 18, 1921.
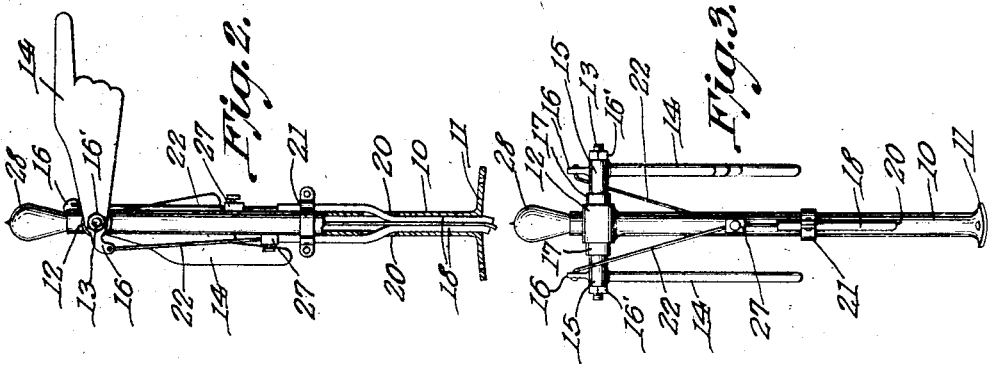
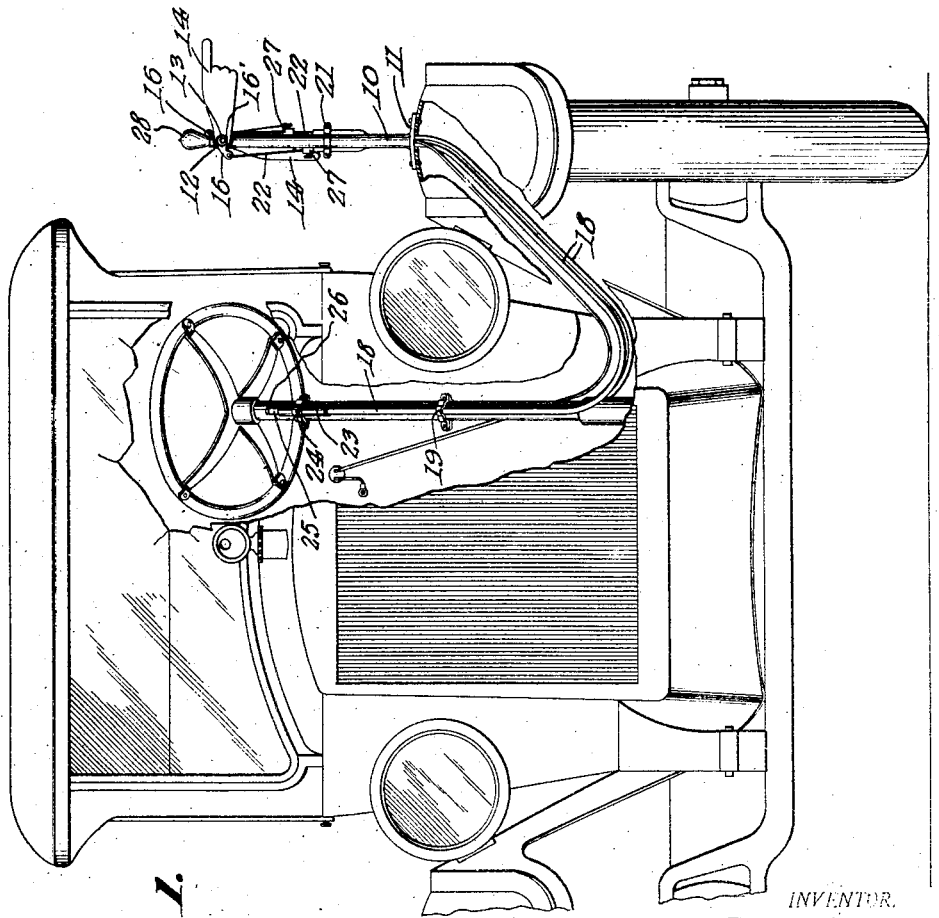
INVENTOR.
Andrew J. Havrilla
BY
Norman J. Whitaker
his ATTORNEY.

UNITED STATES PATENT OFFICE.

ANDREW J. HAVRILLA, OF NEW LONDON, CONNECTICUT.

DIRECTION-INDICATOR.

1,366,261. Specification of Letters Patent. Patented Jan. 18, 1921.

Application filed May 26, 1920. Serial No. 384,295.

*To all whom it may concern:*

Be it known that I, ANDREW J. HAVRILLA, a citizen of Czechoslovakia, and a resident of New London, in the county of New London and State of Connecticut, have invented Direction-Indicators, of which the following is a specification.

My invention relates to direction indicators for automibiles and other vehicles.

Primarily the purpose of the invention is to provide an indicator to be operated by the driver of the automobile to signal to traffic that the automobile is about to turn to the right or left.

Further, the invention provides an indicator or signal to be mounted at the front of the vehicle and where the same can be seen by persons in the front or rear of the automobile to indicate the direction in which the automobile is about to turn.

Another object of the invention resides in the provision of an automobile direction indicator which will be readily visible and the operating or control parts of which are positioned directly on the steering post column within reach of the operator.

It is also an object of the invention to provide an automobile signal or indicator which is of comparative simple construction and one that can be readily installed upon any conventional automobile.

With the preceding and other objects and advantages that may become apparent from the following disclosure, the invention consists in the novel combination of elements, construction and arrangement of parts, operations and structural details that will be hereinafter fully explained and claimed, the preferred embodiment of the invention being illustrated in the attached drawing, wherein, Figure 1 is a side elevation of an automobile having my indicator associated therewith;

Fig. 2 is a front elevation, parts being shown in cross section and part of the automobile being broken away, and one of the signaling semaphores being shown in horizontal or operative position; and Fig. 3 is a fragmentary vertical sectional view of the semaphore support and showing the operating cables associated therewith.

Referring in detail to the drawings, wherein like characters of reference designate corresponding parts throughout the same, the numeral 5 designates the usual automobile including the steering post column 6.

The indicator includes a vertical tube or standard 10 formed with a base flange 11 riveted or otherwise secured to one of the front mud guards or fenders of the automobile. The post 10 terminates at its upper end in a horizontally disposed tubular head 12 through which a pin 13 extends. The semaphores or signaling elements are designated at 14 and each is formed with a bearing or sleeve 15 at one end which is rotatable upon the pin 13 and disposed at opposite sides of the bearing 12. These sleeves 15 are each formed with an oppositely extended longitudinally bowed lever or extension 16. Spacing elements 17 are disposed upon the pin 13 between the opposite ends of the member 12 and the inner end of the bearing or sleeve 15 of the semaphores 14 while nuts 16 are threaded upon the ends of the stem or pin 13. Normally, the semaphores 14 are disposed in a vertical position parallel to the supporting post 10 and when in signaling position they are swung to a position at right angles to the supporting post as illustrated in Fig. 2.

Tubes 18 are arranged upon opposite sides of the steering column and secured thereto by a clamp 19. From the lower end of the steering column the tubes are curved upwardly and extended through the vertical standard and then passed through diametrically opposite openings 20 in the post 10 and arranged along the outer face of this standard for a short distance and secured in position by a clamp 21 encircling the standard. Cables or other flexible operating elements 22 extending through each of the tubes 18 are attached at one end to the levers or extensions 16. The opposite ends of the operating cables 22 extend through tubular guides 23 secured to the steering column by a clamp 24 each of which receives one end of one of the tubes 18 and are connected to a slidable stem 25 provided with laterally disposed fingers 26 to be engaged by the operator to pull the operating cables through the tubes 18 to operate either of the signals.

In order to prevent the flexible elements from being drawn to such an extent to cause the semaphores to be swung to a position past the horizontal, stops 27 are arranged upon the operating cables between their points of attachment to the parts 16 and the upper ends of the tubes 18 with which these stops engage when the operating elements have been drawn through the tubes sufficiently to arrange the semaphores in a horizontal plane.

It has also been found convenient to mount an illuminating lamp 28 upon the hollow head or sleeve 12, the conductors of which pass through the vertical standard 10 and are in circuit with the electrical system (not shown) of the automobile.

From the disclosure it will be obvious upon moving either of the stems 25 upwardly its corresponding semaphore will be arranged in a horizontal position to indicate that the automobile is to turn in that direction and upon releasing the operated stem the semaphore, owing to its weight in comparison to the operating elements, will return to its normal vertical position.

It is to be understood that the form of my invention herein shown and described is to be taken as a preferred example of the same, and that various changes in the shape, size and arrangement of parts may be resorted to without departing from the spirit of the invention or the scope of the subjoined claims.

Having thus described my invention, what I claim as new and desire to secure and protect by Letters Patent of the United States, is:

1. The combination with an automobile, of a tubular standard mounted thereon, a pin passing transversely through the standard, semaphore arms pivoted on the pin to swing in opposite direction, tubes extending along the steering post column and extended upwardly through the standard and having their upper extremities arranged upon opposite sides of the latter, and flexible elements passing through the tubes and each having one extremity attached to the pivoted end of one of the semaphores.

2. In a direction indicator for automobiles, a vertical tubular standard mounted upon one of the front mud guards of the automobile and provided with openings at diametrically opposite points, a pair of semaphores each being provided with a sleeve adjacent one end, a horizontally disposed pin passing through the standard and receiving the sleeves, cables disposed along the steering column and having one end extended through the supporting standard and passed through the openings therein and arranged interiorly of the standard, and flexible elements passing through the tubes and having one of their ends attached to the semaphore arms and their opposite arms in reach of the operator whereupon pulling either of the same through the tubes one of the semaphores will be arranged in horizontal position, the semaphores returning to the vertical position by their own weight.

3. In a direction indicator, a supported vertically arranged tubular standard provided with openings at diametrically opposite points, a pin passing transversely and horizontally through the standard, semaphore arms pivotally mounted on the pin at opposite sides of the tubular standard, tubes extended upwardly through the tubular standard and through the opening therein and along the outer face of said standard, operating flexible elements passing through the tubes and each having one end connected with each of the semaphore arms adjacent its pivoted end whereby to move the same to a horizontal position, and stops longitudinally adjustable on the flexible elements adapted to engage the upper ends of the tubes whereby to prevent the semaphore arms from being moved beyond the horizontal.

ANDREW J. HAVRILLA.